United States Patent [19]

Yang

[11] 4,035,444

[45] July 12, 1977

[54] TWO-STEP POLYMERIZATION PROCESS AND PRODUCT THEREOF

[75] Inventor: Hsun-kuang Yang, Northfield, Ohio

[73] Assignee: The B. F. Goodrich Company, Akron, Ohio

[21] Appl. No.: 627,090

[22] Filed: Oct. 30, 1975

[51] Int. Cl.$^2$ .............. C08F 297/08; C08F 297/06
[52] U.S. Cl. ............................................ 260/878 B
[58] Field of Search ............................. 260/878 B

[56] References Cited

U.S. PATENT DOCUMENTS 3,684,785   8/1972   Hasegawa et al. ................ 260/85.3

FOREIGN PATENT DOCUMENTS 664,208   6/1963   Canada

OTHER PUBLICATIONS

*Chemical Abstracts*, 62, 6565e (1965).

*Primary Examiner*—Alan Holler
*Attorney, Agent, or Firm*—Charles A. Crehore

[57] ABSTRACT

A two-step process comprises (A) polymerizing ethylene in the presence of a catalyst comprising (1) at least one organoaluminum compound, (2) at least one titanium tetrahalide and (3) optionally, at least one Lewis base, and (B) thereafter polymerizing isoprene in the presence of the step (A) reaction mixture. The reaction product contains polymerized therein about 0.05 to about 2.2 weight percent ethylene. The reaction product has satisfactory green strength and monomer conversion efficiency together with excellent processability.

12 Claims, No Drawings

TWO-STEP POLYMERIZATION PROCESS AND PRODUCT THEREOF

BACKGROUND OF THE INVENTION

It is known in the art to prepare polyisoprene containing a high amount of cis-1,4 configuration using as the catalyst a mixture of a trialkylaluminum compound and a titanium tetrahalide. The high cis-1,4-polyisoprene has properties similar when vulcanized to those of vulcanized natural rubber and is a valuable general purpose rubber. However, the unvulcanized synthetic natural (SN) rubber has poorer green strength than natural rubber.

Canadian Pat. No. 664,208 teaches a very general two-stage process for reacting a polyolefinic monomer with a 1-monoolefinic hydrocarbon monomer.

U.S. Pat. No. 3,684,785 teaches a process for polymerizing isoprene using a catalyst consisting essentially of an organoaluminum compound and a titanium tetrahalide. The latter polymerization reaction is conducted in the presence of a small amount of ethylene not exceeding 8 parts by weight per 100 parts by weight of isoprene. It has been found that isoprene reacts preferentially to ethylene, particularly in the presence of a solvent. The heat of polymerization may also cause unreacted ethylene to vent from the reactor, creating a need for expensive refluxing and ethylene recovery equipment and resulting in poor conversion (e.g. about 20-25% by weight of ethylene to polymer). Moreover, processability (i.e. extrudability) of polymers made by the latter process may also be poor.

A new process is desired for polymerizing ethylene and isoprene to a product having satisfactory green strength and ethylene conversion efficiency together with excellent processability.

SUMMARY OF THE INVENTION

A two-step process comprises (A) polymerizing ethylene in the presence of a catalyst comprising at least one organoaluminum compound and at least one titanium tetrahalide and (B) thereafter polymerizing isoprene in the presence of the step (A) reaction mixture. The reaction product contains polymerized therein about 0.05 to about 2.2 weight percent ethylene.

DETAILED DESCRIPTION

Ethylene and isoprene are polymerized in a twostep polymerization process. (A) Ethylene polymerization is carried to substantial completion in the presence of a catalyst comprising (1) at least one organoaluminum compound, (2) at least one titanium tetrahalide and (3) optionally at least one Lewis base. (B) Thereafter isoprene is polymerized in the presence of the step (A) reaction mixture. The product of the process contains polymerized therein from about 0.05 to about 2.2 weight percent, more preferably from about 0.5 to 2 weight percent of ethylene.

The catalyst used in this invention comprises a mixture of (1) at least one organoaluminum compound having the formula

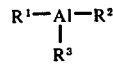

wherein $R^1$ is an alkyl group containing from 1 to 12 carbon atoms, more preferably from 2 to 8 carbon atoms, a cycloalkyl group containing from 4 to 12 carbon atoms, more preferably from 4 to 8 carbon atoms, or an aryl, alkaryl or aralkyl group containing from 6 to 14 carbon atoms, and $R^2$ and $R^3$ are hydrogen, halogen or the same as $R^1$, and (2) at least one titanium tetrahalide. The catalyst may also contain as a third component a Lewis base such as an amine or an unpolymerizable ether.

Organoaluminum compounds suitable for use in this invention include trialkylaluminums such as triethylaluminum, triisobutylaluminum, trihexylaluminum and the like; tricycloalkylaluminums such as tricyclopentylaluminum, tricyclohexylaluminum and the like; triarylaluminums and trialkarylaluminums such as triphenylaluminum, tri(o-, m-and p-tolyl)aluminum and the like; triaralkylaluminums such as tribenzylaluminum and the like; alkylaluminum hydrides such as diethylaluminum hydride, diisobutylaluminum hydride and the like; and alkylaluminum halides such as diethylaluminum chloride, ethylaluminum dichloride, and the like. More preferred organoaluminum compounds include trialkylaluminums wherein each alkyl group contains from 1 to 12 carbon atoms, more preferably from 2 to 8 carbon atoms, such as triethylaluminum, triisobutylaluminum, trihexylaluminum, and the like. Excellent results were obtained using triisobutylaluminum.

Titanium tetrahalides suitable for use in this invention include titanium tetrachloride, titanium tetrabromide, titanium tetrafluoride and titanium tetraiodide. More preferred titanium tetrahalides include titanium tetrachloride and titanium tetrabromide. Excellent results were obtained using titanium tetrachloride.

A Lewis base, such as an amine or an unpolymerizable ether, may be used as an optional third catalyst component. Suitable amines include primary, secondary and tertiary alkylamines containing from 1 to 18 carbon atoms, such as methylamine, dimethylamine, trimethylamine, diethylamine, triethylamine, tripropylamine and the like; primary, secondary and tertiary aryl, alkaryl and aralkyl amines containing from 6 to 24 carbon atoms such as phenylamine, diphenylamine, triphenylamine, tribenzylamine and the like; alicyclic amines containing from 4 to 20 carbon atoms such as cyclohexylamine and the like; and heterocyclic amines containing from 4 to 20 carbon atoms such as piperazine, piperidine, pyrrole, 3-pyrroline, pyrrolidine, and the like.

Ethers suitable for use as optional third catalyst components included alkyl ethers containing from 2 to 20 carbon atoms such as dimethyl ether, diethyl ether, di-n-butyl ether and the like, aromatic ethers containing from 12 to 20 such carbon atoms such as diphenyl ether and the like; and alkylaromatic ethers containing from 7 to 20 carbon atoms such as anisole and the like. More preferred ethers include dialkyl ethers containing from 2 to 10 carbon atoms such as dimethyl ether, diethyl ether, di-n-butyl ether and the like. Excellent results were obtained using di-n-butyl ether.

The polymerization reaction of this invention may be carried out in bulk or solution, more preferably in solution. Suitable solvents include the inert liquid hydrocarbons, e.g. liquid alkanes and cycloalkanes containing from 3 to 10 carbon atoms such as propane, butane, pentane, hexane, heptane, octane, cyclohexane and the like; and liquid aromatic compounds containing from 6 to 14 carbon atoms, such as benzene, toluene, xylene, mesitylene, durene and the like. Other suitable solvents include halogenated liquid hydrocarbons such as chlorobenzene and the like. Mixtures of the foregoing solvents may also be used. Excellent results were obtained using butane and hexane.

The catalyst used in the present invention may be prepared by reacting the catalyst components in bulk or a solvent defined heretofore and in the absence of oxygen, water or other compounds capable of reacting with and deactivating the catalyst or it components. The catalyst preparation may be carried out conveniently by mixing the organoaluminum compound with a deaerated, dewatered solvent defined heretofore and/or with the optional third catalyst component described heretofore. Mixing may be done under an inert atmosphere such as nitrogen, argon, helium or the like. The amount of solvent may be as much as the full amount of solvent to be used in the polymerization or only a small fraction (e.g. 0.25%–5 wt.%) of the total solvent. The titanium tetrahalide may than be mixed in slowly at a temperature from about −80° C to about 80° C, more preferably from about −80° C to about −20° C. The optional third catalyst component defined heretofore should not be mixed with the titanium tetrahalide in the absence of the organoaluminum compound. The mixture may be chilled at about −45° C to about −70° C until a precipitate forms. The prepared catalyst may be used immediately but preferably is aged at a temperature from about −40° C to about 0°to C, preferably at about −20° C for about 10 hours or more before mixing it with ethylene. The preferred catalysts made in this manner are usually darkcolored slurries in final form.

A suitable molar ratio of organoaluminum compound to titanium tetrahalide may be from about 0.6/1 to about 2/1, more preferably from about 0.8/1 to about 1.25/1. A suitable molar ratio of organoaluminum compound to the third catalyst component defined heretofore, if used, typically may be from about 1/1 to about 20/1, more preferably from about 6/1 to about 15/1. From about 0.1 millimole to about 50 millimoles of catalyst and more may be used per mole of total monomer, more preferably from about 0.1 millimoles to about 20 millimoles of catalyst per mole of total monomer. Total monomer is defined as the total amount of ethylene and isoprene. The total solvent volume may be from about 0 to about 100 times the monomer volume, more preferably from about 3 to about 10 times the monomer volume.

Ethylene may be mixed with the catalyst solution described heretofore using any conventional contacting technique. The temperature may be maintained at a substantially constant level from about −40° C to about 90° C, more preferably from about 0° C to about 40° C, until a homoploymer slurry is obtained which is substantially free of unreacted ethylene. The reaction generally goes to substantially complete (about 100%) conversion. In order to prevent inhibition of the second stage polymerization and to guard against possible production of homopolymers and copolymers of widely varying composition and structure, there should be no substantial amount of unreacted ethylene present in the reaction solution when isoprene is added thereafter.

Isoprene is mixed thereafter with the first stage ethylene homopolymer slurry and the polymerization continued until a significant amount of isoprene has polymerized. The second stage polymerization may also be carried to substantial completion, although unreacted isoprene is easily stripped and recovered if complete conversion is not desired. A more typical isoprene conversion is about 80%.

Following the second polymerization stage the polymer cement is preferably treated with a shortstopping agent which deactivates the catalyst and converts it to a more soluble form which is easily removed from the polymer. Preferred shortstopping agents are miscible with the polymerization solvent and include alcohols such as methanol, ethanol, isopropanol, ethylene glycol, glycerine and the like. Water, esters, ketones, ethers and amides may also be used as shortstops. Excellent results were obtained using methanol as a shortstopping agent.

After the catalyst has been inactiviated, the polymer may be coagulated and solvent stripped therefrom using steam or hot water. Alternatively the polymer may be coagulated by mixing with a nonsolvent such as alcohol or acetone. The coagulate and mixture of solvent and nonsolvent may be separated by conventional means such as filtration, centrifugation or the like. The polymer may be dried under vacuum or by heatng in an air drier or the like. Antioxidants, stabilizers or the like may be added at any point before or during coagulation and drying, preferably before coagulation.

The products of the two-step polymerization process may be vulcanized by methods known to the art. Suitable vulcanizing agents include elemental sulfur and compounds capable of yielding elemental sulfur such as tetramethylthiuram disulfide, tetraethylthiuram disulfide, dipentamethylenethiuram hexasulfide, and the like.

A broad range of compounding ingredients can be used together with the products of the two-step polymerization process, such ingredients including sulfur-containing and nitrogen-containing accelerators. Examples of suitable accelerators include metal salts of dialkyl, diaryl and alkaryl dithiocarbamates such as bismuth, copper, lead and zinc dimethyl dithiocarbamates, cadmium, selenium, tellurium and zinc diethyl dithiocarbamates, sodium and zinc dibutyl dithiocarbamates, zinc ethyl phenyl dithiocarbamate, zinc dibenzyl dithiocarbamate, and the like; other dithiocarbamates such as piperidinium pentamethylene dithiocarbamate, N-cyclohexylethyl ammonium cyclohexylethyl dithiocarbamate, N-pentamethylene-ammonium-N-pentamethylene dithiocarbamate, and the like; benzothiazoles such as 2-mercaptobenzothiazole and the zinc salt thereof, 2,2'-benzothiazyl disulfide, 2-morpholinothiobenzothiazole, 2-(2,6-dimethyl-4-morpholinothio) benzothiazole, and the like; benzothiazolesulfenamides such as N-diethyl-2-benzothiazyl sulfenamide, N-t-butyl-2-benzothiazole sulfenamide, N-cyclohexyl-2-benzothiazole sulfenamide, N-oxydiethylene-2-benzothiazole sulfenamide, and the like; thiuram sulfides such as tetramethyl thiuram disulfide, tetraethyl thiuram disulfide, dimethyl diphenyl thiuram disulfide, dipentamethylene thiuram hexasulfide, and the like; thioureas such as ethylene thiourea, trimethyl thiourea, N,N'-diethyl thiourea, N,N'-dibutyl thiourea, N,N'-diphenyl thiourea, and the like; morpholines such as 4,4'-dithiomorpholine, and the like; polyamines such as triethylene diamine, hexamethylene tetraamine, tricretonylidene tetraamine, and the like; aldehyde-amine consensation products such as acetaldehyde-ammonia, heptaldehyde-ammonia, butyraldehyde-aniline, and the like; imidazolines such as 2-mercaptoimidazoline, and the like; and guanidines such as diphenyl guanidine, di-o-tolyl guanidine, and the like. Excellent results were obtained using N-cyclohexyl-2-benzothiazole sulfenamide.

Other compounding ingredients useful together with the products of the two-step polymerization process include activators such as zinc oxide and the like; fillers such as carbon blacks, calcium and magnesium carbonates, calcium and barium sulfates, aluminum silicates, silicon dioxide, phenol-formaldehyde and polystyrene resins, asbestos and the like; plasticizers and extenders including dialkyl and diaryl acid esters such as diisobutyl, diisooctyl, diisodecyl and dibenzyl oleates, stearates, sebacates, azelates, phthalates, and the like, and naphthenic and paraffinic oils, castor oil, tall oil, stearic acid, calcium stearate and the like; and antioxidants, antiozonants and stabilizers such as di-$\beta$-naphthyl-p-phenylene-diamine, phenyl-$\beta$-napthylamine, N-isopropyl-N'-phenyl-p-phenylenediamine, N,N'-di-(2-octyl)-p-phenylenediamine, 2,2'-methylene-bis (4-methyl-6-t-butylphenol), 2,6-di-t-butyl-p-cresol, 2,2'-thiobis(4-methyl-6-t-butylphenol), distearyl thiodipropionate, dilauryl thiodipropionate, 2,4-bis(4-hydroxy-3,5-t-butylphenoxy)-6-(n-octylthio)-1,3,5-triazine, tetrakis methylene 3-(3',5'-di-t-butyl-4'-hydroxyphenyl)-propionate methane, 4-isopropylamino diphenylamine, tri(nonylated phenyl)phosphite, polymerized 1,2-dihydro-2,2, 4-trimethylquinoline, and the like. Other compounding ingredients may also be used, such as pigments, tackifiers, flame retardants, fungicides and the like.

The following examples illustrate the present invention more fully.

EXAMPLES

Catalyst Preparation Procedure

A one-quart stainles steel reactor was cleaned thoroughly, dried, purged with dry nitrogen, and cooled to $-62°$ C. A 15 wt.% solution of triisobutylaluminum in hexane was mixed with di-n-butyl ether in a molar ratio of triisobutylaluminum to di-n-butyl ether of about 6.7/1. The triisobutylaluminum/di-n-butyl ether/hexane solution was fed simultaneously into the reactor together with a 15 wt.% solution of $TiCl_4$ in hexane in a molar ratio of triisobutylaluminum to $TiCl_4$ of about 1/1. A continuous process was used at about $-62°$ C. A dark-brown slurry formed which was aged for at least about 10 hours at about $-17°$ C before use.

Polymerization Procedures

Bottle polymerization of ethylene in step one of the process of this invention was used in some examples and allowed easy handling of small ethyleneamounts. Reactor polymerization was used for larger ethylene amounts. This variation is reaction method is not believed to have affected polymer properties.

1. Bottle Polymerization of Ethylene followed by Reactor Polymerization of Isoprene Bottle polymerization was conducted as follows. 80 grams of catalyst slurry prepared as described heretofore was charged to a clean, dry, capped quart bottle which had been purged with nitrogen. 300 grams of hexane was charged to the bottle in order to dilute the catalyst. Ethylene was charged to the bottle with simultaneous mild agitation using a magnetic stirrer. The bottle then was placed in a water bath at about 15°–25° C. in order to control polymerization temperature. Polymerization began immediately. The bottle was weighed periodically and more ethylene added to the reaction mixture if needed. Reaction was continued for about 1 hour and produced a polyethylene-catalyst slurry, which was stored at about $-15°$ C. until used for the next polymerication step.

In a second step, the polyethylene-catalyst slurry was transferred to a 5-gallon stainless steel reactor containing about 27 lbs. of a feedstock mixture comprising about 20 wt.% isoprene and 80 wt.% butane. Polymerization was conducted at about 30° C., with cooling being done by circulating $-17°$ C. brine through a reactor jacket. The polymerization was shortstopped at about 7 to 13 wt.% total solids using methanol. About 1.5 wt.% of 2,6-di-t-butyl-p-cresol using was added to the reactor, based upon total polymer weight. The polymer was coagulated, and hexane, butane and excess isoprene were removed by steam stripping. Crumb rubber particles were separated by screen and dried in a vacuum drier.

2. Reactor Polymerization of Ethylene followed by Reactor Polymerization of Isoprene 7 lbs. of hexane was charged to a clean, stainless steel reactor which had been purged with nitrogen followed by 80 grams of catalyst slurry prepared as described heretofore. Ethylene was charged to the reactor with simultaneous agitation. Polymerization began immediately, and polymerization temperature was controlled by circulating $-17°$ C brine through a reactor jacket.

After about 0.5 hour the first step polymerization typically was complete, and about 20 lbs. of feedstock mixture was charged comprising about 20 wt.% isoprene and 80 wt.% butane. Polymerization was continued at about the same temperature as before and shortstopped at about 7 to 13 wt.% total solids using methanol. The polymer was stabilized and recovered using the same procedures described heretofore.

Compounding

The polymers prepared by the process just described were compounded using the following recipe:

| MATERIAL | WT. PARTS |
| --- | --- |
| Two-step Polymer | 100 |
| N-358 SPF Black | 60 |
| Zinc Oxide | 5 |
| Stearic Acid | 2.5 |
| Naphthenic Oil, ASTM D2226, Type 103 | 10 |
| Alkyl Phenol Novolak Resin | 5 |
| Polymerized 1,2-dihydro-2,2,4-trimethylquinoline | 0.75 |
| N-isopropyl-N'-phenyl-p-phenylenediamine | 0.75 |
| N-cyclohexyl-2-benzothiazole-sulfenamide | 1 |
| Sulfur | 2 |
| TOTAL | 187 |

Compounding was done using a two-roll mill operating at a roll temperature of about 66° C. Total compounding time was about 15 minutes. When compounding was complete the material was stripped from the mill and cured by heating at about 150° C. for about 15 minutes.

TEST METHODS

Percentages of polyethylene in the finished polymers were measured using a modification of the method described by Kolthoff et al, 1 J. Polymer Sci. 429 (1946). A 1.2 gram polymer sampled was stirred into 80 ml. of o-dichlorobenzene. The mixture was heated at about 145°–155° C. with stirring for about 3 hours and thereafter cooled to about 130° C. 18 ml. of t-butyl hydroperoxide (90% pure) was added together with 4.8 ml. of a 0.25 millimolar OsO₄ solution in benzene. The reaction mixture was heated for about 40 minutes at about 130°–145° C. and thereafter poured while hot and with stirring into about 600 ml. of methanol and 2 drops of concentrated H₂SO₄. The reaction mixture was cooled and filtered three times using 10 microns, 5 micron and 0.2 micron filters. The filters and contents were washed with distilled methanol and dried for about 1 hour at about 110° C. The percentage of polyless surface roughness and in general more acceptable appearance:

| NUMBER | SURFACE APPEARANCE RATING |
|---|---|
| 15 – 16 | Excellent |
| 12 – 14 | Good |
| 10 – 12 | Fair |
| Less than 10 | Poor - Unacceptable |

Test results are summarized in Table I.

TABLE 1

| Example | 1 | 2 | 3 | 4 | 5 | 6 | 7 | 8 | 9 |
|---|---|---|---|---|---|---|---|---|---|
| Polymerization Data | | | | | | | | | |
| Ethylene Polymer in 2-Step Polymer, Wt.% | 0.23 | 0.52 | 1.0 | 1.3 | 1.5 | 2.4 | 3.0 | 6.2 | 9.0 |
| Ethylene Polymerization method | * | * | ** | * | * | ** | ** | ** | ** |
| Test Data - Raw Polymer | | | | | | | | | |
| Mooney Viscosity | 82 | 92 | 93 | 104 | 104 | 115 | 104 | 110 | 116 |
| Test Data - Compound | | | | | | | | | |
| 300% Modulus at 22° C, psi | 1600 | 1950 | 2000 | 2150 | 1600 | 2350 | 2200 | 2200 | 2200 |
| Tensile Strength at 22° C, psi | 3500 | 3500 | 3250 | 3400 | 2700 | 3400 | 3700 | 2800 | 3200 |
| % Ultimate Elongation at 22° C. | 580 | 530 | 470 | 500 | 500 | 460 | 510 | 380 | 460 |
| Durometer Hardness, Type A | 66 | 72 | 72 | 74 | 76 | 78 | 72 | 78 | 78 |
| Monsanto Rheometer Data: | | | | | | | | | |
| Minimum Torque, in.-lbs. | 6.5 | 7.0 | 7.2 | 8.3 | 7.7 | 10 | 9.4 | 12 | 13.8 |
| Maximum Torque, in.-lbs. | 70.2 | 67.3 | 71.2 | 74.2 | 70 | 74.3 | 71.4 | 73.1 | 73.5 |
| Incipient Cure Time, min. | 5.8 | 5.8 | 5.5 | 5.7 | 6 | 5.8 | 6 | 6 | 5.7 |
| Time to 90% Cure, min. | 13.5 | 13 | 12.7 | 13 | 12.8 | 13 | 13.7 | 13.3 | 12.7 |
| Test Data - Uncured Compound | | | | | | | | | |
| Mooney Viscosity | 90 | 100 | 104 | 113 | 110 | 158 | 145 | 178 | 215 |
| Yield Point, psi. | 60 | 60 | 180 | 120 | 137 | *** | *** | 700 | *** |
| Break Point, psi. | 23 | 30 | 110 | 80 | 87 | 370 | 230 | 650 | 1200 |
| % Ultimate Elongation | 500 | 1000 | 250 | 400 | 500 | 150 | 150 | 220 | 100 |
| Garvey Die Extrusion Rating | 15.5 | 15.5 | 15 | 12.5 | 13.5 | 7 | 5.5 | 5.5 | 0 |
| Garvey Die Extrusion Rating | Excellent | Excellent | Excellent | Good | Good | Poor | Poor | Poor | Poor |

* Bottle polymerization of ethylene in first step, followed by reactor polymerization of isoprene.
** Reactor polymerization of ethylene in first step, followed by reactor polymerization of isoprene.
*** No yield point.

ethylene in the sample was calculated by dividing the weight of filter residue by total sample weight and multiplying the quotient by 100.

Uncured compound samples were tested for green strength using ASTM412-68 Die B dumbbells. Test data obtained included yield point, break point and % ultimate elongation. Satisfactory green strength signifies that the polymer has the necessary cohesive strength for easy handling during compounding.

Mooney viscosity was tested both before and after compounding, with testing before performed according to ASTM D-1646-72 using a large rotor, a 1-minute warm-up time, and a 4-minute shearing time. 300% modulus, tensile strength and ultimate elongation were tested at about 22° C. according to ASTM D412-68 using Die B dumbbells and compound samples cured for about 15 minutes at about 150° C. Durometer hardness was measured at about 22° C. according to ASTM D2240-68 using a Shore Type A durometer and a one second indentation hardness time interval; compound samples were cured before testing for about 15 minutes at about 150° C. Monsanto rheometer properties were tested at about 150° C. according to ASTM D2084-71T. Data reported includes minimum torque, maximum torque, incipient cure time and time of 90% of cure.

Garvey die extrusion properties were tested at about 110° C. following procedures in ASTM D-2230-73. Extruded samples were rated on appearance according to the following numerical scale, with higher numbers indicating straighter edges and corners, less swelling, The data in Table I demonstrates that green strength was satisfactory and increased somewhat with increasing polyethylene content. Other properties were similar to those of natural rubber. Cure rates of all compound samples were similar according to the Monsanto Rheometer test. Surprisingly and unexpectedly, Mooney viscosity of the uncured compound increased substantially for polymer samples containing polymerized therein more than about 2.2 wt.% ethylene, while extrudability worsened markedly and became unacceptable.

The products produced by the process of this invention have satisfactory green strength and monomer conversion efficiency together with excellent processability. The products are useful wherever natural rubber or synthetic natural rubber may be used, such as in tires, belts, hose, gaskets, shoe heels and soles, cements, athletic goods, toys, rubber flooring, pressure-sensitive tapes and the like.

I claim:

1. A product of a process comprising (A) polymerizing ethylene monomer in the presence of a catalyst comprising (1) at least one organoaluminum compound and (2) at least one titanium tetrahalide and (B) thereafter polymerizing isoprene monomer in the presence of the step (A) reaction mixture, there being no substantial amount of unreacted ethylene present in the reaction mixture when isoprene is added thereto, said organoaluminum compound having the formula

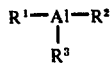

wherein $R^1$ is an alkyl group containing from 1 to 12 carbon atoms, a cycloalkyl group containing from 4 to 12 carbon atoms, or an aryl, alkaryl or aralkyl group containing from 6 to 14 carbon atoms, $R^2$ and $R^3$ are hydrogen, halogen or the same as $R^1$, the molar ratio of said organoaluminum compound of said titanium tetrahalide is from about 0.6/1 to about 2/1, from about 0.1 millimole to about 50 millimoles of said catalyst is used per mole of total monomer, and said product contains polymerized therein about 0.05 to about 2.2 weight percent ethylene.

2. A product of a process of claim 1 wherein said organoaluminum compound is a trialkylaluminum compound wherein each alkyl group contains from 2 to 8 carbon atoms.

3. A product of a process of claim 2 wherein said titanium tetrahalide is titanium tetrachloride or titanium tetrabromide.

4. A product of a process of claim 3 wherein said titanium tetrahalide is titanium tetrachloride, and said trialkylaluminum compound is triisobutylaluminum.

5. A product of a process of claim 1 wherein the polymerization is carried out in an inert solvent.

6. A product of a process of claim 1 wherein said catalyst contains an ether or an amine as a third catalyst component.

7. A process comprising (A) polymerizing ethylene monomer in the presence of a catalyst comprising (1) at least one organoaluminum compound and (2) at least one titanium tetrahalide and (B) thereafter polymerizing isoprene monomer in the presence of the step (A) reaction mixture, there being no substantial amount of unreacted ethylene present in the reaction mixture when isoprene is added thereto, said organoluminum compound having the formula

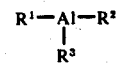

wherein $R^1$ is an alkyl group containing from 1 to 12 carbon atoms, a cycloalkyl group containing from 4 to 12 carbon atoms, or an aryl, alkaryl or aralkyl group containing from 6 to 14 carbon atoms, $R^2$ and $R^3$ are hydrogen, halogen or the same as $R^1$, the molar ratio of said organoaluminum compound to said titanium tetrahalide is from about 0.6/1 to about 2/1, from about 0.1 millimole to about 50 millimoles of said catalyst is used per mole of total monomer, and the product of said process contains polymerized therein about 0.05 to about 2.2 weight percent ethylene.

8. A process of claim 7 wherein said organoaluminum compound is a trialkylaluminum compound wherein each alkyl group contains from 2 to 8 carbon atoms.

9. A process of claim 8 wherein said titanium tetrahalide is titanium tetrachloride or titanium tetrabromide.

10. A process of claim 9 wherein said titanium tetrahalide is titanium tetrachloride, and said trialkylaluminum compound is triisobutylaluminum.

11. A process of claim 7 wherein the polymerization is carried out in an inert solvent.

12. A process of claim 7 wherein said catalyst contains an ether or an amine as a third catalyst compoud.

* * * * *

UNITED STATES PATENT OFFICE
CERTIFICATE OF CORRECTION

Patent No. 4,035,444            Dated   July 12, 1977

Inventor(s)   Hsun-Kuang Yang

It is certified that error appears in the above-identified patent and that said Letters Patent are hereby corrected as shown below:

Column 5, line 51, change "ethyleneamounts" to ---ethylene amounts---; Column 5, line 53, change "is reaction" to ---in reaction---; Column 7, line 42, change "ASTM412-68" to ---ASTM D412-68---;
Table I, column 2, change "Excel- to ---Excel- ---;
                               lent            lent
                               lent"
Table I, column 3, change "Excel-" to ---Excel- ---;
                                          lent
Column 9, claim 1, line 10, change "of" to ---to---;
Column 10, claim 12, line 33, change "compound" to ---component---.

Signed and Sealed this

Twenty-fifth Day of October 1977

[SEAL]

Attest:

RUTH C. MASON  
Attesting Officer

LUTRELLE F. PARKER  
Acting Commissioner of Patents and Trademarks